United States Patent
Kim et al.

(10) Patent No.: US 12,365,209 B2
(45) Date of Patent: Jul. 22, 2025

(54) VEHICLE SUSPENSION SYSTEM FOR VEHICLE HEIGHT ADJUSTMENT AND CONTROL METHOD THEREFOR

(71) Applicant: HL MANDO CORPORATION, Pyeongtaek (KR)

(72) Inventors: Youngjae Kim, Daejeon (KR); Namho Kim, Yongin (KR)

(73) Assignee: HL MANDO CORPORATION, Pyeongtaek (KR)

(*) Notice: Subject to any disclaimer, the term of this patent is extended or adjusted under 35 U.S.C. 154(b) by 0 days.

(21) Appl. No.: 18/420,845

(22) Filed: Jan. 24, 2024

(65) Prior Publication Data

US 2025/0135827 A1  May 1, 2025

(30) Foreign Application Priority Data

Oct. 25, 2023 (KR) .................. 10-2023-0143759

(51) Int. Cl.
*B60G 17/015* (2006.01)
*B60G 17/056* (2006.01)

(52) U.S. Cl.
CPC ..... *B60G 17/0152* (2013.01); *B60G 17/0565* (2013.01); *B60G 2202/412* (2013.01); *B60G 2500/302* (2013.01)

(58) Field of Classification Search
CPC ........... B60G 17/0152; B60G 17/0565; B60G 2202/412; B60G 2500/302; B60G 17/017; B60G 17/0155; B60G 2500/202
See application file for complete search history.

(56) References Cited

FOREIGN PATENT DOCUMENTS

| EP | 0791492 A1 * | 8/1997 | ........... B60G 17/016 |
| EP | 1508460 A1 * | 2/2005 | ......... B60G 17/0152 |
| KR | 20170086979 A * | 7/2017 | ........... B60G 17/056 |

OTHER PUBLICATIONS

Kwon, KR 20170086979 A, Machine Translation of Specification (Year: 2017).*

* cited by examiner

*Primary Examiner* — Paul N Dickson
*Assistant Examiner* — Matthew Joseph Ganci
(74) *Attorney, Agent, or Firm* — Harvest IP Law, LLP (57) ABSTRACT

A vehicle suspension system for vehicle height adjustment comprises: a damper for adjusting a height of a vehicle with neutral pressure by driving a piston up and down in a space inside a damping cylinder in which fluid is accommodated to a pressurization region in a pressurization direction and a restoration region in a restoration direction; an actuator, connected to a flow path of the damper, for adjusting the neutral pressure of the damper; a two-way control valve that operates on and off to allow and block movement of the fluid in the damping cylinder and the fluid in the hydraulic cylinder in both directions; a reservoir for regulating gas pressure in the damping cylinder; and a control unit that controls a pressure of the motor pump of the actuator.

20 Claims, 6 Drawing Sheets

VEHICLE SUSPENSION SYSTEM FOR VEHICLE HEIGHT ADJUSTMENT AND CONTROL METHOD THEREFOR

TECHNICAL FIELD

The present disclosure relates to a vehicle suspension system for vehicle height adjustment and a method for controlling the same, and in particular, to a vehicle suspension system for vehicle height adjustment and a control method therefor, which is capable of protecting impact of a vehicle from the ground and improving ride comfort by adjusting a height of the vehicle which is a distance from the ground to the vehicle.

BACKGROUND

In general, a suspension, which is a device that maintains a height of a vehicle which is a distance from the ground to the vehicle, supports the weight of the vehicle, and relieves the impact of the vehicle from the ground, is used in vehicles, carriages, and transportation means, and includes a spring device with elasticity and a damper device with absorptivity.

For example, compared to vehicles equipped with a general suspension, an electronic control suspension (ECS) has the advantage of providing optimized ride comfort and driving stability through appropriate damping force and height control depending on driving conditions.

In particular, an active suspension, which is a type of the electronic control suspension, is a technology that is attracting attention because it can adjust the spring constant or damping force appropriately depending on driving conditions by supplying energy from the outside in response to various driving conditions such as loaded weight, road surface conditions, and driving speed.

However, in the case of such a suspension, a shock absorption valve is provided between pressure control valves, so if there is a pressure difference between the pressure control valves due to the shock absorption valve, the desired force cannot be generated, and in normal driving conditions, it serves only as a passive damper, which has a limit on ride comfort control.

SUMMARY

In view of the above, the present disclosure provides a vehicle suspension system for vehicle height adjustment and a control method therefor, which can protect a vehicle from impact from the ground and improve ride comfort by adjusting a height of the vehicle, which is the distance from the ground to the vehicle, depending on driving conditions.

However, the objects to be achieved by the present disclosure are not limited to the above, and other objects may exist.

In accordance with one embodiment of the present disclosure, there is provided a vehicle suspension system for vehicle height adjustment, which comprises: a damper for adjusting a height of a vehicle with neutral pressure by driving a piston up and down in a space inside a damping cylinder in which fluid is accommodated to a pressurization region in a pressurization direction and a restoration region in a restoration direction; an actuator, connected to a flow path of the damper, for adjusting the neutral pressure of the damper by driving a motor pump to move fluid in a hydraulic cylinder; a two-way control valve that operates on and off to allow and block movement of the fluid in the damping cylinder and the fluid in the hydraulic cylinder in both directions; a reservoir for regulating gas pressure in the damping cylinder; and a control unit that controls a pressure of the motor pump of the actuator in response to a required neutral pressure of the damper, controls on/off of the two-way control valve, and controls the gas pressure of the reservoir.

In accordance with another embodiment of the present disclosure, there is provided a vehicle suspension system for vehicle height adjustment, which comprises: a damper for adjusting a height of a vehicle with neutral pressure by driving a piston up and down in a space inside a damping cylinder in which fluid is accommodated to a pressurization region in a pressurization direction and a restoration region in a restoration direction; an actuator, connected to a flow path of the damper, for adjusting the neutral pressure of the damper by driving a motor pump to move fluid in a hydraulic cylinder; a two-way control valve that operates on and off to allow and block movement of the fluid in the damping cylinder and the fluid in the hydraulic cylinder in both directions; a first solenoid valve provided on a flow path formed between the restoration region of the damper and the actuator; a reservoir for regulating gas pressure in the damping cylinder; and a control unit that controls a pressure of the motor pump of the actuator in response to a required neutral pressure of the damper, controls on/off of the two-way control valve, and controls the gas pressure of the reservoir.

In accordance with still another embodiment of the present disclosure, there is provided a control method of a vehicle suspension system for vehicle height adjustment, which comprises: calculating a required neutral pressure of a damper corresponding to a vehicle height adjustment input from an outside in a control unit; switching a two-way control valve to an on state in the control unit; performing a drive of a motor pump of an actuator in response to the calculated required neutral pressure of the damper in the control unit; regulating a gas pressure in a damping cylinder in response to the calculated required neutral pressure of the damper in a reservoir; and switching the two-way control valve to an off state in the control unit.

According to the embodiments of the present disclosure described above, by adjusting the height of the vehicle that is the distance from the ground to the vehicle depending on the driving conditions, it is possible to protect the vehicle from impact from the ground and improve ride comfort.

DETAILED DESCRIPTION

Hereinafter, embodiments of the present disclosure will be described in detail with reference to the accompanying drawings so that those skilled in the art can easily implement the present disclosure. However, the present disclosure may be implemented in various different forms without being limited to the embodiments disclosed below. In order to clearly illustrate the present disclosure, parts that are not related to the description are omitted in the drawings, and similar parts are given similar reference numerals throughout the specification. In addition, in describing the present disclosure with reference to the drawings, the components' with the same name may be given different reference numerals depending on the drawings. The reference numerals are provided for convenience of explanation, and are not to be construed as limiting the concept, feature, function, or effect of each component.

Throughout the specification, when it is described that a part is "connected" to another part, this includes not only a case where they are "directly connected" but also a case where they are "electrically connected" with other element therebetween. In addition, when it is described that a part "include" a certain component, this means that it may further include other components without excluding other components unless specifically stated to the contrary, and it should be understood that this does not exclude in advance the possibility of the presence or addition of features, numbers, steps, operations, components, parts, or combinations thereof.

In the present specification, 'unit' or 'module' includes a unit realized by hardware or software, and a unit realized using both, and one unit may be realized using two or more hardware, and two or more units may be realized by one hardware.

Figure 1:
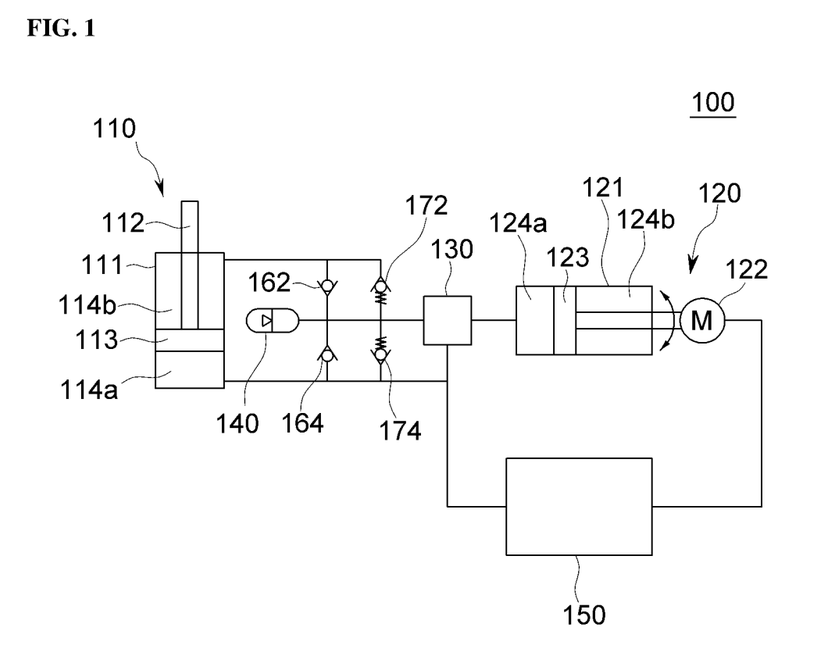
FIG. 1 is a diagram schematically showing the configuration of a vehicle suspension system for vehicle height adjustment according to a first embodiment of the present disclosure.
Figure 2:
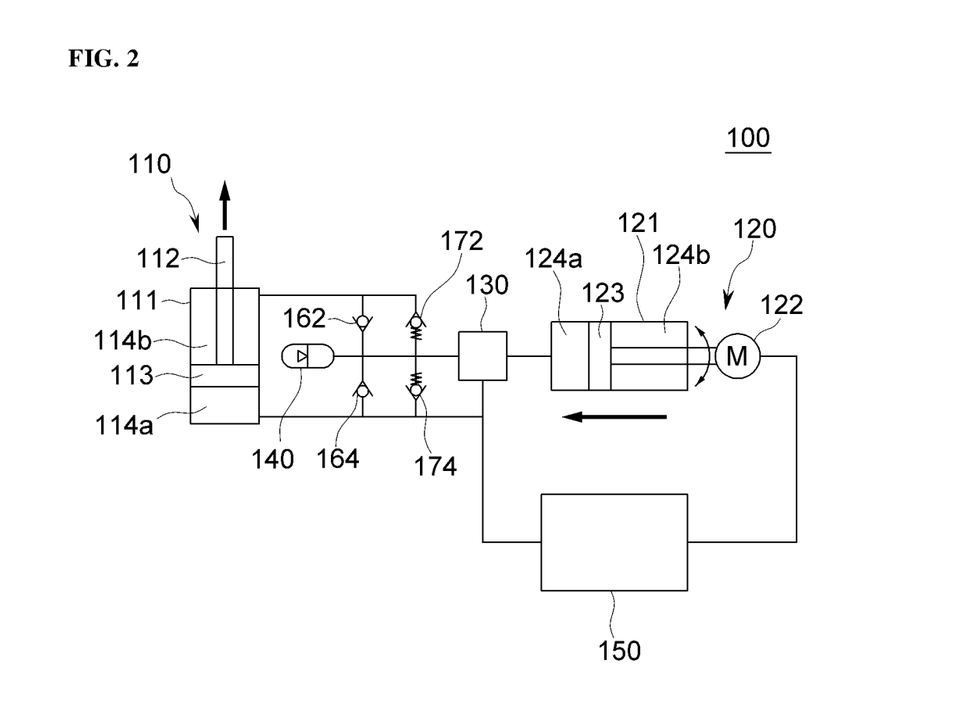
FIG. 2 is a diagram showing an operating state when increasing the vehicle height in FIG. 1.
Figure 3:
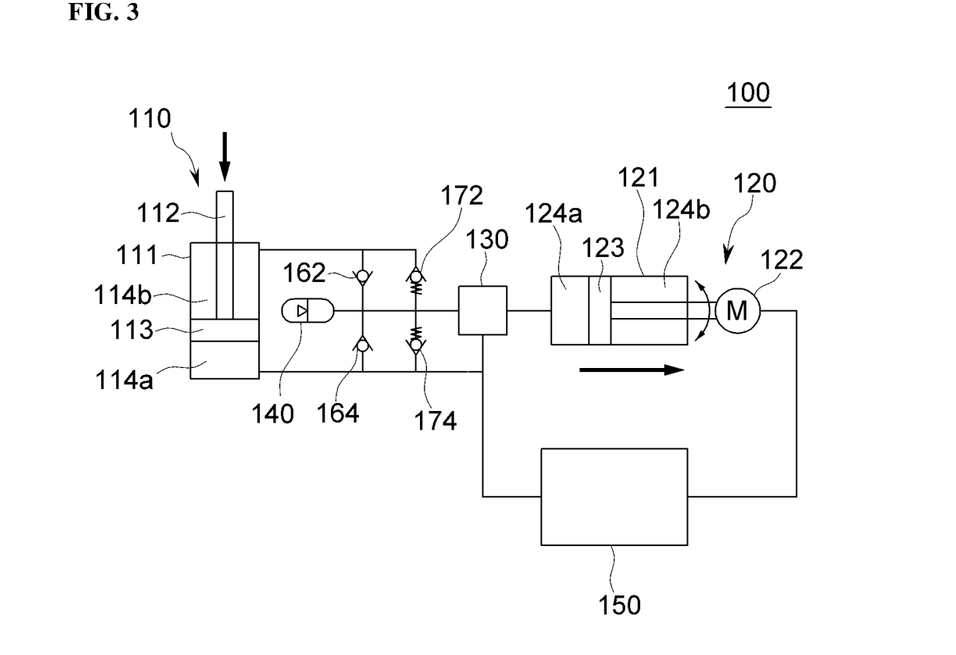
FIG. 3 is a diagram showing an operating state when decreasing the vehicle height in FIG. 1.

FIG. 1 is a diagram schematically showing the configuration of a vehicle suspension system for vehicle height adjustment according to a first embodiment of the present disclosure, FIG. 2 is a diagram showing an operating state when increasing the vehicle height in FIG. 1, and FIG. 3 is a diagram showing an operating state when decreasing the vehicle height in FIG. 1.

As shown in FIG. 1, a vehicle suspension system 100 for vehicle height adjustment according to one embodiment of the present disclosure may includes a damper 110, an actuator 120, a two-way control valve 130, a reservoir 140, a control unit 150, a first check valve 162, a second check valve 164, a first pressure control valve 172, and a second pressure control valve 174.

The damper 110 may adjust the vehicle height with a neutral pressure by driving a piston up and down in a space inside a damping cylinder in which fluid is accommodated to a pressurization region in a pressurization direction and a restoration region in a restoration direction.

More specifically, the damper 110 includes a damping cylinder 111 in which fluid is accommodated, and a rod 112 and a damping piston 113 provided inside the damping cylinder 111, and the rod 112 and the damping piston 113 are driven to a pressurization region 114a in the pressing direction and a restoration region 114b in the restoring direction in the space inside the damping cylinder 111.

In this case, the damper 110 is a mechanical control suspension (MCS) type and may be configured as a twin tube or a mono tube.

For example, a mono-tube damper includes an inner cylinder made of one inner tube in which fluid and gas layers are isolated by an intermediate piston, and energy is absorbed through the fluid and gas pressure inside the piston to move the piston.

In addition, a twin-tube damper includes of an inner tube and an outer tube, wherein fluid exists in a lower part of the inner tube, a piston is located above the fluid, and the fluid and gas is filled in the outer tube to be movable. The piston is moved by the pressure of the fluid and gas in the outer tube.

The actuator 120 is connected to a flow path of the damper 110 and adjusts the neutral pressure of the damper 110 by driving a motor pump 122 to move the fluid in a hydraulic cylinder 121.

More specifically, the actuator 120 may include a hydraulic cylinder 121 that accommodates fluid therein, a hydraulic piston 123 provided inside the hydraulic cylinder 121, and a motor pump 122 for driving the hydraulic piston 123 to a forward region 124a or a reverse region 124b.

When adjusting the vehicle height by increasing the neutral pressure of the damper 110, the actuator 120 causes the fluid stored in the hydraulic cylinder 121 to move the hydraulic piston 123 to the forward region 124a by driving the motor pump 122.

In addition, when adjusting the vehicle height by lowering the neutral pressure of the damper 110, the actuator 120 causes the fluid stored in the hydraulic cylinder 121 to move the hydraulic piston 123 to the reverse region 124b by driving the motor pump 122.

The two-way control valve 130 operates on and off to allow and block movement of the fluid in the damping cylinder 111 and the fluid in the hydraulic cylinder 121 in both directions.

More specifically, when increasing the vehicle height, the two-way control valve 130 switches to the on state so that the fluid in the hydraulic cylinder 121 of the actuator 120 moves into the damping cylinder 111 of the damper 110, and then switches back to the off state so that the fluid remains in the damping cylinder 111.

When decreasing the vehicle height, the two-way control valve 130 switches to the on state so that the fluid in the damping cylinder 111 of the damper 110 moves into the hydraulic cylinder 121 of the actuator 120, and then switches back to the off state so that the fluid remains in the hydraulic cylinder 121.

The reservoir 140 regulates the gas pressure in the damping cylinder 111.

More specifically, the reservoir 140 adjusts the vehicle height by regulating the gas pressure after the movement of the fluid through the two-way control valve 130.

For example, in the case of the twin-tube damper, the reservoir 140 has compressed gas between the inner tube and the outer tube. In this case, according to the operation of the inner tube, the gas is expanded to increase the gas pressure in the damping cylinder 111, causing the rod 112 to rise and increase the vehicle height, or is compressed to decrease the gas pressure in the damping cylinder 111, causing the rod 112 to descend and decrease the vehicle height.

The control unit 150 controls the pressure of the motor pump 122 of the actuator 120 in response to a required neutral pressure of the damper 110, controls the on/off of the two-way control valve 130, and controls the gas pressure of the reservoir 140.

More specifically, the control unit 150 calculates the required neutral pressure of the damper corresponding to the vehicle height adjustment input from the outside. The control unit 150 controls the drive of the motor pump 122 of the actuator 120 in response to the calculated required neutral pressure of the damper 110, and controls the reservoir 140 to regulate the gas pressure in the damping cylinder 111 in response to the calculated required neutral pressure of the damper 110.

As an example, when increasing the vehicle height, the control unit 150 controls the two-way control valve 130 to switch to the on state, and controls the motor pump 122 of the actuator 120 to perform pressurization.

That is, after the two-way control valve 130 is switched to the on state, the control unit 150 controls such that fluid is supplied to the damper 110 through pressurization drive of the motor pump 122, and the gas pressure in the damping cylinder 111 is increased through the reservoir 140 to increase the neutral pressure of the damper 110. In this case, the fluid in the hydraulic cylinder 121 passes through an inlet and moves to an outlet of the two-way control valve 130, and the control unit 150 controls the first pressure control valve 172 to increase pressure, so that the fluid flows into the pressurization region. Accordingly, the fluid moves the piston toward the restoration region.

Further, the control unit 150 controls the two-way control valve 130 to switch to the off state.

In addition, when decreasing the vehicle height, the control unit 150 controls the two-way control valve 130 to switch to the on state, and controls the motor pump 122 of the actuator 120 to perform restoration.

That is, after the two-way control valve 130 is switched to the on state, the control unit 150 controls such that the fluid in the damper 110 is moved into the actuator 120 through the restoration drive of the motor pump 122, and the gas pressure in the damping cylinder 111 is decreased through the reservoir 140 to lower the neutral pressure of the damper 110. In this case, as the control unit 150 controls the second pressure control valve 174 to lower the pressure, fluid flows into the hydraulic cylinder 121 of the actuator 120 and the piston 113 moves toward the pressurization region.

Further, the control unit 150 controls the two-way control valve 130 to switch to the off state.

In addition, the first check valve 162 may be arranged in parallel with the first pressure control valve 172 on a flow path formed between the restoration region of the damper 110 and the actuator 120.

The second check valve 164 may be arranged in parallel with the second pressure control valve 174 on a flow path formed between the pressurization region of the damper 110 and the actuator 120.

The first pressure control valve 172 may be provided on a flow path formed between the restoration region of the damper 110 and the actuator 120.

The second pressure control valve 174 may be provided on a flow path formed between the pressurization region of the damper 110 and the actuator 120.

Figure 4:
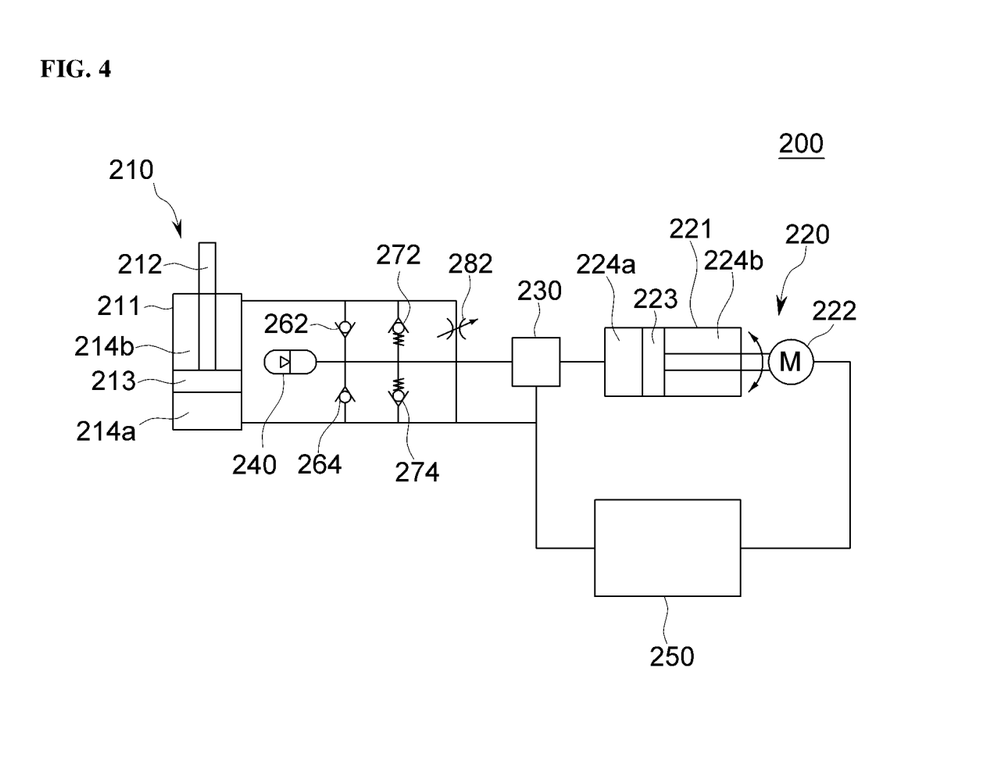
FIG. 4 is a diagram schematically showing the configuration of a vehicle suspension system for vehicle height adjustment according to a second embodiment of the present disclosure.

In addition, FIG. 4 is a diagram schematically showing the configuration of a vehicle suspension system for vehicle height adjustment according to a second embodiment of the present disclosure. In this case, detailed description of the same configuration as the above-described first embodiment will be omitted by reference As shown in FIG. 4, the vehicle suspension system 200 for vehicle height adjustment according to the second embodiment of the present disclosure may include a damper 210 for adjusting the vehicle height with a neutral pressure by driving a piston 213 up and down in a space inside a damping cylinder 211 in which fluid is accommodated to a pressurization region in a pressurization direction and a restoration region in a restoration direction; an actuator 220 that is connected to a flow path of the damper 210 and adjusts the neutral pressure of the damper 210 by driving a motor pump 222 to move the fluid in a hydraulic cylinder 221; a two-way control valve 230 that operates on and off to allow and block movement of the fluid in the damping cylinder 211 and the fluid in the hydraulic cylinder 221 in both directions; a first solenoid valve 282 provided on a flow path formed between the restoration region of the damper 210 and the actuator 220; a reservoir 240 that adjusts the gas pressure in the damping cylinder 211; and a control unit 250 that controls the pressure of the motor pump 222 of the actuator 220 in response to a required neutral pressure of the damper 210, controls the on/off of the two-way control valve 230, and controls the gas pressure of the reservoir 240.

In addition, a first check valve 262 may be arranged in parallel with a first pressure control valve 272 on a flow path formed between the restoration region of the damper 210 and the actuator 220

A second check valve 264 may be arranged in parallel with a second pressure control valve 274 on a flow path formed between the pressurization region of the damper 210 and the actuator 220.

The first pressure control valve 272 may be provided on a flow path formed between the restoration region of the damper 210 and the actuator 220.

The second pressure control valve 274 may be provided on a flow path formed between the pressurization region of the damper 210 and the actuator 220.

Meanwhile, the damper 210 may be configured as an ECS (Electronic Control Suspension) type twin tube or mono tube, and may be selected depending on the driving conditions and performance requirements of the vehicle. In this case, the ECS is a device that automatically adjusts the height of the vehicle and the spring constant and damping force of the suspension by manipulating an actuator, and a solenoid valve may be applied.

The first solenoid valve 282 may control pressure more variably than the pressure of the first pressure control valve 272 and the second pressure control valve 274 to increase damping force. For example, the first solenoid valve 282 can control pressure with damping force of 14 levels.

When increasing the vehicle height, the control unit 250 controls the two-way control valve 230 to switch to the on state so that the motor pump of the actuator 220 performs pressurization, and then controls the two-way control valve 230 to switch to the off state. In this case, the control unit 250 controls such that fluid is supplied to the damper 210 through the pressurization of the motor pump, and the gas pressure in the damping cylinder 211 is increased through the reservoir 240 to increase the neutral pressure of the damper 210.

In addition, when decreasing the vehicle height, the control unit 250 controls the two-way control valve 230 to switch to the on state so that the motor pump of the actuator 220 performs restoration, and then controls the two-way control valve 230 to switch to the off state. In this case, the control unit 250 controls such that fluid flows into the actuator 220 through the restoration of the motor pump, and the gas pressure in the damping cylinder 211 is lowered through the reservoir 240 to lower the neutral pressure of the damper 210.

Figure 5:
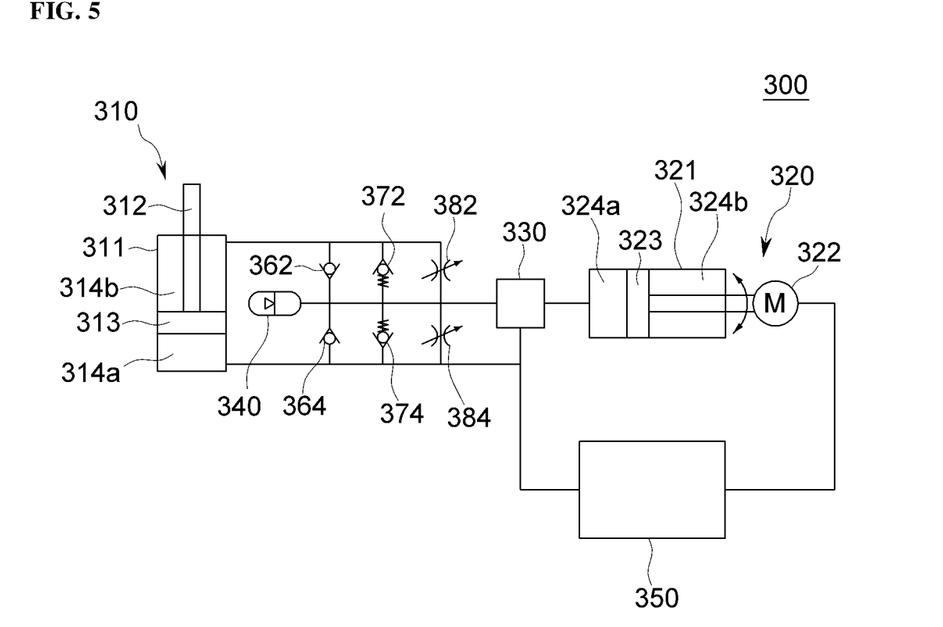
FIG. 5 is a diagram schematically showing the configuration of a vehicle suspension system for vehicle height adjustment according to a third embodiment of the present disclosure.

In addition, FIG. 5 is a diagram schematically showing the configuration of a vehicle suspension system for vehicle height adjustment according to a third embodiment of the present disclosure. In this case, detailed description of the same configuration as the above-described first and second embodiments will be omitted by reference As shown in FIG. 5, a vehicle suspension system 300 for vehicle height adjustment according to the third embodiment of the present disclosure may include a damper 310 for adjusting the vehicle height with a neutral pressure by driving a piston 313 up and down in a space inside a damping cylinder 311 in which fluid is accommodated to a pressurization region in a pressurization direction and a restoration region in a restoration direction; an actuator 320 that is connected to a flow path of the damper 310 and adjusts the neutral pressure of the damper 310 by driving a motor pump 322 to move the fluid in a hydraulic cylinder 321; a two-way control valve 330 that operates on and off to allow and block movement of the fluid in the damping cylinder 311 and the fluid in the hydraulic cylinder 321 in both directions; a first solenoid valve 382 provided on a flow path formed between the restoration region of the damper 310 and the actuator 320; a second solenoid valve 384 provided on a flow path formed between the pressurization region of the damper 310 and the actuator 320; a reservoir 340 that adjusts the gas pressure in the damping cylinder 311; and a control unit 350 that controls the pressure of the motor pump 322 of the actuator 320 in response to a required neutral pressure of the damper 310, controls the on/off of the two-way control valve 330, and controls the gas pressure of the reservoir 350.

In addition, a first check valve 362 may be arranged in parallel with a first pressure control valve 372 on a flow path formed between the restoration region of the damper 310 and the actuator 320

A second check valve 364 may be arranged in parallel with a second pressure control valve 374 on a flow path formed between the pressurization region of the damper 310 and the actuator 320.

The first pressure control valve 372 may be provided on the flow path formed between the restoration region of the damper 310 and the actuator 320.

The second pressure control valve 374 may be provided on the flow path formed between the pressurization region of the damper 310 and the actuator 320.

Meanwhile, the damper 310 may be configured as an ECS (Electronic Control Suspension) type twin tube or mono tube, and may be selected depending on the driving conditions and performance requirements of the vehicle. In this case, the ECS is a device that automatically adjusts the height of the vehicle and the spring constant and damping force of the suspension by manipulating an actuator, and dual solenoid valves may be applied.

The first solenoid valve 382 and the second solenoid valve 384 may control pressure more variably than the pressure of the first pressure control valve 372 and the second pressure control valve 374 to increase damping force. For example, a dual configuration of the first solenoid valve 382 and the second solenoid valve 384 can control pressure with damping force of 14×14 levels.

When increasing the vehicle height, the control unit 350 controls the two-way control valve 330 to switch to the on state so that the motor pump of the actuator 320 performs pressurization, and then controls the two-way control valve 330 to switch to the off state. In this case, the control unit 350 controls such that fluid is supplied to the damper 310 through the pressurization of the motor pump, and the gas pressure in the damping cylinder 311 is increased through the reservoir 340 to increase the neutral pressure of the damper 310.

In addition, when decreasing the vehicle height, the control unit 350 controls the two-way control valve 330 to switch to the on state so that the motor pump of the actuator 320 performs restoration, and then controls the two-way control valve 330 to switch to the off state. In this case, the control unit 350 controls such that fluid flows into the actuator 320 through the restoration of the motor pump, and the gas pressure in the damping cylinder 311 is lowered through the reservoir 340 to lower the neutral pressure of the damper 310.

Figure 6:
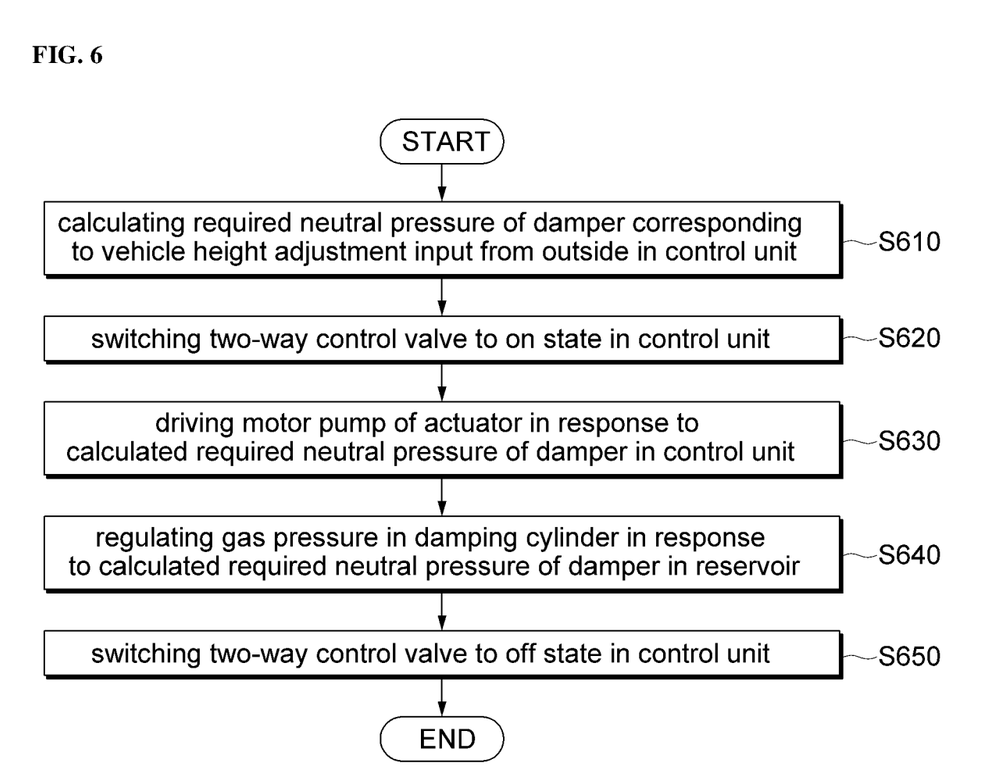
FIG. 6 is a flowchart of a control method of a vehicle suspension system for vehicle height adjustment according to one embodiment of the present disclosure.

FIG. 6 is a flowchart of a control method of a vehicle suspension system for vehicle height adjustment according to one embodiment of the present disclosure.

As shown in FIG. 6, the control method of the vehicle suspension system for vehicle height adjustment according to the present disclosure first performs a step of calculating a required neutral pressure of the damper corresponding to a vehicle height adjustment input from the outside in the control unit (S610).

More specifically, the control unit calculates the required neutral pressure of the damper corresponding to the vehicle height adjustment value. In this case, the control unit may store a speed at which the damping piston moves (damper velocity), a gas pressure of the reservoir, and a driving force of the motor pump of the actuator as a map. In other words, the control unit may store the actuator force according to the damper velocity and the set pressure of the gas pressure of the reservoir at a constant flow rate input of the motor pump, and calculate the required neutral pressure based on this.

Then, the control unit performs a step of switching the two-way control valve to the on state (S620).

More specifically, when increasing the vehicle height, the two-way control valve switches to the on state so that the fluid in the hydraulic cylinder of the actuator moves into the damping cylinder of the damper, and then switches back to the off state to allow fluid to remain in the damping cylinder.

In addition, when it is desired to lower the vehicle height, the two-way control valve is switched to the on state to allow the fluid in the damping cylinder of the damper to move to the hydraulic cylinder of the actuator, and then switched back to the off state to allow the fluid to remain in the hydraulic cylinder.

Next, the control unit performs a step of driving the motor pump of the actuator in response to the calculated required neutral pressure of the damper (S630).

More specifically, after the two-way control valve is switched to the on state, the control unit controls such that fluid is supplied to the damper through pressurization drive of the motor pump to increase the neutral pressure of the damper. In this case, the fluid in the hydraulic cylinder passes through the inlet and moves to the outlet of the two-way control valve, and as the control unit controls the pressure of the first pressure control valve to increase, the fluid flows into the pressurization region. Accordingly, the fluid moves the piston toward the restoration region.

In addition, when decreasing the vehicle height, the control unit controls the two-way control valve to switch to the on state, and controls the motor pump of the actuator to perform restoration.

That is, after the two-way control valve is switched to the on state, the control unit controls the fluid in the damper to be moved into the actuator through the restoration drive of the motor pump so that the neutral pressure of the damper is lowered. In this case, as the control unit controls the second pressure control valve to lower the pressure, fluid flows into the hydraulic cylinder of the actuator and the piston moves toward the pressurization region.

Next, a step of regulating the gas pressure in the damping cylinder in response to the calculated required neutral pressure of the damper is performed in the reservoir (S640).

More specifically, the reservoir adjusts the vehicle height by regulating the gas pressure after the movement of fluid through the two-way control valve.

For example, in the case of the twin-tube damper, the reservoir has compressed gas between the inner tube and the outer tube. In this case, according to the operation of the inner tube, the gas is expanded to increase the gas pressure in the damping cylinder, causing the rod to rise and increase the vehicle height, or is compressed to decrease the gas pressure in the damping cylinder, causing the rod to descend and decrease the vehicle height.

Then, the control unit performs a step of switching the two-way control valve to the off state (S650). That is, the two-way control valve is controlled to switch to the off state and block the movement of fluid.

The description of the present disclosure described above is for illustrative purposes, and it will be understood by those skilled in the art to which the present disclosure pertains that it can easily modified into other specific forms without changing the technical idea or essential features of the present disclosure. Therefore, the embodiments described above should be understood in all respects as illustrative and not restrictive. For example, each component described as a single form may be implemented in a distributed manner, and similarly, components described as distributed may also be implemented in a combined form The scope of the present disclosure is defined by the following claims rather than the detailed description above, and all changes or modifications derived from the meaning and scope of the claims and their equivalent concepts should be construed as being included in the scope of the present disclosure.

DESCRIPTION OF REFERENCE NUMERALS

110: damper
111: damping cylinder
112: rod
113: damping piston
120: actuator
121: hydraulic cylinder
122: motor pump
123: hydraulic piston
130: two-way control valve
140: reservoir
150: control unit

What is claimed is:

1. A vehicle suspension system for vehicle height adjustment, comprising:
    a damper for adjusting a height of a vehicle with neutral pressure by driving a piston up and down in a space inside a damping cylinder in which fluid is accommodated to a pressurization region in a pressurization direction and a restoration region in a restoration direction;
    an actuator, connected to a flow path of the damper, for adjusting the neutral pressure of the damper by driving a motor pump to move fluid in a hydraulic cylinder;
    a two-way control valve that operates on and off to allow and block movement of the fluid in the damping cylinder and the fluid in the hydraulic cylinder in both directions;
    a reservoir for regulating gas pressure in the damping cylinder; and
    a control unit that controls a pressure of the motor pump of the actuator in response to a required neutral pressure of the damper, controls on/off of the two-way control valve, and controls the gas pressure of the reservoir;
    wherein the reservoir adjusts the vehicle height by regulating the gas pressure after the movement of the fluid through the two-way control valve;
    wherein the reservoir increases the gas pressure in the damping cylinder, causing a rod to rise and increase the vehicle height, or decreases the gas pressure in the damping cylinder, causing the rod to descend and decrease the vehicle height.

2. The vehicle suspension system of claim 1, wherein the damper is configured as a twin tube or mono tube of a mechanical control suspension (MCS) type.

3. The vehicle suspension system of claim 1, further comprising:
    a first pressure control valve provided on a flow path formed between the restoration region of the damper and the actuator;
    a second pressure control valve provided on a flow path formed between the pressurization region of the damper and the actuator;
    a first check valve arranged in parallel with the first pressure control valve on a flow path formed between the restoration region of the damper and the actuator; and
    a second check valve arranged in parallel with the second pressure control valve on a flow path formed between the pressurizing region of the damper and the actuator.

4. The vehicle suspension system of claim 1, wherein when increasing the vehicle height, the control unit controls the two-way control valve to switch to an on state so that the motor pump of the actuator performs pressurization, and then controls the two-way control valve to switch to an off state.

5. The vehicle suspension system of claim 4, wherein after the two-way control valve is switched to the on state, the control unit controls such that fluid is supplied to the damper through the pressurization of the motor pump and the gas pressure in the damping cylinder is increased through the reservoir to increase the neutral pressure of the damper.

6. The vehicle suspension system of claim 1, wherein when decreasing the vehicle height, the control unit controls the two-way control valve to switch to an on state so that the motor pump of the actuator performs restoration, and then controls the two-way control valve to switch to an off state.

7. The vehicle suspension system of claim 6, wherein after the two-way control valve is switched to the on state, the control unit controls such that fluid is moved into the damper through the restoration of the motor pump and the gas pressure in the damping cylinder is decreased through the reservoir to lower the neutral pressure of the damper.

8. A vehicle suspension system for vehicle height adjustment, comprising:
    a damper for adjusting a height of a vehicle with neutral pressure by driving a piston up and down in a space inside a damping cylinder in which fluid is accommodated to a pressurization region in a pressurization direction and a restoration region in a restoration direction;

an actuator, connected to a flow path of the damper, for adjusting the neutral pressure of the damper by driving a motor pump to move fluid in a hydraulic cylinder;

a two-way control valve that operates on and off to allow and block movement of the fluid in the damping cylinder and the fluid in the hydraulic cylinder in both directions;

a first solenoid valve provided on a flow path formed between the restoration region of the damper and the actuator;

a reservoir for regulating gas pressure in the damping cylinder; and a control unit that controls a pressure of the motor pump of the actuator in response to a required neutral pressure of the damper, controls on/off of the two-way control valve, and controls the gas pressure of the reservoir;

wherein the reservoir adjusts the vehicle height by regulation the gas pressure after the movement of the fluid through the two-way control valve, wherein the reservoir increases the gas pressure in the damping cylinder, causing a rod to rise and increase the vehicle height, or decreases the gas pressure in the damping cylinder, causing the rod to descend and decrease the vehicle height.

9. The vehicle suspension system of claim 8, wherein the damper is configured as a twin tube or mono tube of an electronic control suspension (ECS) type.

10. The vehicle suspension system of claim 8, further comprising:
a second solenoid valve provided on a flow path formed between the pressurization region of the damper and the actuator.

11. The vehicle suspension system of claim 8, further comprising:
a first pressure control valve arranged in parallel with the first solenoid valve on a flow path formed between the restoration region of the damper and the actuator;
a second pressure control valve provided on a flow path formed between the pressurization region of the damper and the actuator;
a first check valve arranged in parallel with the first pressure control valve on a flow path formed between the restoration region of the damper and the actuator; and
a second check valve arranged in parallel with the second pressure control valve on a flow path formed between the pressurizing region of the damper and the actuator.

12. The vehicle suspension system of claim 8, wherein when increasing the vehicle height, the control unit controls the two-way control valve to switch to an on state so that the motor pump of the actuator performs pressurization, and then controls the two-way control valve to switch to an off state.

13. The vehicle suspension system of claim 12, wherein after the two-way control valve is switched to the on state, the control unit controls such that fluid is supplied to the damper through the pressurization of the motor pump and the gas pressure in the damping cylinder is increased through the reservoir to increase the neutral pressure of the damper.

14. The vehicle suspension system of claim 8, wherein when decreasing the vehicle height, the control unit controls the two-way control valve to switch to an on state so that the motor pump of the actuator performs restoration, and then controls the two-way control valve to switch to an off state.

15. The vehicle suspension system of claim 14, wherein after the two-way control valve is switched to the on state, the control unit controls such that fluid is moved into the damper through the restoration of the motor pump and the gas pressure in the damping cylinder is decreased through the reservoir to lower the neutral pressure of the damper.

16. A control method of a vehicle suspension system for vehicle height adjustment, the method comprising:
calculating a required neutral pressure of a damper corresponding to a vehicle height adjustment input from an outside in a control unit;
switching a two-way control valve to an on state in the control unit;
performing a drive of a motor pump of an actuator in response to the calculated required neutral pressure of the damper in the control unit;
regulating a gas pressure in a damping cylinder in response to the calculated required neutral pressure of the damper in a reservoir; and
switching the two-way control valve to an off state in the control unit;
wherein in the regulating a gas pressure in a damping cylinder in response to the calculated required neutral pressure of the damper in a reservoir, the reservoir adjusts the vehicle height by regulating the gas pressure after the movement of the fluid through the two-way control valve;
wherein the reservoir increases the gas pressure in the damping cylinder, causing a rod to rise and increase the vehicle height, or decreases the gas pressure in the damping cylinder, causing the rod to descend and decrease the vehicle height.

17. The control method of claim 16, wherein in the performing the drive of the motor pump of the actuator, in a case of increasing the vehicle height, pressurization drive of the motor pump of the actuator is performed to supply fluid to the damper.

18. The control method of claim 17, wherein in a case of increasing the vehicle height, in the regulating the gas pressure in the damping cylinder, the control unit controls such that the gas pressure in the damping cylinder is increased through the reservoir to increase the neutral pressure of the damper.

19. The control method of claim 16, wherein in the performing the drive of the motor pump of the actuator, in a case of decreasing the vehicle height, restoration drive of the motor pump of the actuator is performed to move fluid into the actuator.

20. The control method of claim 19, wherein in a case of decreasing the vehicle height, in the regulating the gas pressure in the damping cylinder, the control unit controls such that the gas pressure in the damping cylinder is decreased through the reservoir to lower the neutral pressure of the damper.

* * * * *